United States Patent
Djeiranishvili et al.

(10) Patent No.: US 6,296,744 B1
(45) Date of Patent: Oct. 2, 2001

(54) APPARATUS FOR THE ELECTROCHEMICAL TREATMENT OF A LIQUID MEDIUM

(75) Inventors: Nougzar Djeiranishvili; Sergei Boutine; Gennadii Evseevich Meerkop, all of Moscow (RU)

(73) Assignee: Sterilox Technologies International Limited, Oxfordshire (GB)

( * ) Notice: Subject to any disclaimer, the term of this patent is extended or adjusted under 35 U.S.C. 154(b) by 0 days.

(21) Appl. No.: 09/331,547

(22) PCT Filed: Dec. 18, 1997

(86) PCT No.: PCT/GB97/03477

§ 371 Date: Oct. 14, 1999

§ 102(e) Date: Oct. 14, 1999

(87) PCT Pub. No.: WO98/27013

PCT Pub. Date: Jun. 25, 1998

(30) Foreign Application Priority Data

Dec. 18, 1996 (RU) .................................................. 96123484

(51) Int. Cl.[7] .................................................. C25B 9/00
(52) U.S. Cl. ............................................. 204/263; 204/264
(58) Field of Search ..................................... 204/263, 264

(56) References Cited

U.S. PATENT DOCUMENTS 5,427,667 * 6/1995 Bakhir et al. ........................ 204/260
5,628,888 * 5/1997 Bakhir et al. ........................ 204/260
6,093,307 * 7/2000 Su et al. ................................ 205/696

FOREIGN PATENT DOCUMENTS

2253860 * 9/1992 (GB) .
2257982 * 1/1993 (GB) .
2056364 * 3/1993 (RU) .

OTHER PUBLICATIONS

PCT International Search Report, Apr. 1998.*

* cited by examiner

Primary Examiner—Kathryn Gorgos
Assistant Examiner—Thomas H Parsons
(74) Attorney, Agent, or Firm—Akin, Gump, Strauss, Hauer & Feld, L.L.P (57) ABSTRACT

There is disclosed an apparatus for the electrochemical treatment of a liquid medium, which allows the production of a sterilizing solution as well as the decontamination and purification of liquid mediums from toxic organic substances and other impurities. The apparatus contains a diaphragm-shaped electrolytic midstream cell, a feed line for the liquid medium being processed, a cathodic outlet line for carrying the liquid medium out of the cathode chamber to a place of collection or discharge, an anodic outlet line for carrying the liquid medium out of the anode chamber into a catalytic reactor for breaking down active chlorine, an exit line for carrying the liquid medium to the place of collection, and a bypass line, an additional exit line and a flow switching device. The apparatus can also be equipped with a flow switching device, a connecting line, a midstream expansion tank, a purification filter and other components.

15 Claims, 5 Drawing Sheets

APPARATUS FOR THE ELECTROCHEMICAL TREATMENT OF A LIQUID MEDIUM

BACKGROUND OF THE INVENTION

1. Field of the Invention

The present invention relates to electrochemical technology for the treatment of a liquid medium and concerns an apparatus for the electrochemical treatment of a liquid medium with the aim of obtaining a sterilising solution, disinfectant, decontaminant, bleach, antiseptic detergent or medicinal solution having, for example, an anti-bacterial or anti-viral action, and with the aim of disinfecting the liquid medium and/or purifying it from easily oxidised organic substances and impurities, heavy metals and iron. It is also possible in this way to effect changes in the pH and/or in the redox potential of the liquid medium.

The field of application of the present invention covers: public health establishments; food, chemical and other industries; disinfection and purification of water intended for drinking purposes and for use in swimming pools; liquid waste from technological establishments or drainage water.

2. Description of the Related Art

The electrochemical treatment (electrolysis) of a liquid medium is one of a number of processes widely used in practice. During the electrochemical treatment process, a continuous electrical current is passed through the liquid medium and directed at unipolar electrodes positioned in the liquid medium, to an anode having positive polarity and to a cathode having negative polarity. Under the action of the current in the liquid medium being processed, electrochemical reactions occur, as a result of which products of electrolysis are formed: anode products in the liquid medium processed anodically, and cathode products in the liquid medium processed cathodically. In order that the anodic and cathodic products do not become mixed with the reciprocal chemical reactions during the electrochemical treatment process, a semi-permeable barrier in the form of a diaphragm or a membrane is placed in the area between the electrodes. The electrochemical treatment of the liquid medium in the area between the electrodes, divided off by the diaphragm or membrane and forming the isolated anodic and cathodic chambers, is termed unipolar; in the anode chamber, the liquid medium, is subjected to anodic treatment, and in the cathode chamber the liquid medium is subjected to cathodic treatment. When the anodically treated liquid medium is mixed with the cathodically treated liquid medium, an electrochemically treated liquid medium with mixed anodic and cathodic products of electrolysis is obtained.

The prior art in the field of applied electrochemistry is an apparatus for the electrochemical treatment of a liquid medium, for example an aqueous solution of common salt (sodium chloride solution), containing a midstream electrolytic cell with unipolar electrodes of positive and negative polarity, which are connected to a source of continuous electrical current and positioned on both sides away from the semi-permeable diaphragm, which divides the cell into anode and cathode chambers with pipes attached to their nozzles for the introduction and removal of the liquid medium; a water-jet ejector chamber, in which the flow of water is mixed with concentrated salt water solution, a process which includes bringing it to the required concentration, is positioned on the feed line (see, for example, GB 2 253 860).

With the help of this device, anodic products of electrolysis are obtained in the solution of sodium chloride in the form of active chlorine, or cathodic products of electrolysis are obtained in the form of sodium hydroxide; a mildly acidic chlorine-containing anolyte which is used as a means of sterilisation or disinfection, and an alkali-containing catholyte, used as a detergent. This device does not allow electrochemically treated products of other compositions or pH to be obtained together with a stable concentration of mixed anodic and cathodic products of electrolysis; nor does it allow the electrochemical treatment of water intended for drinking purposes to be carried out by disinfecting it or by purifying it from active chlorine compounds, iron, heavy metals or easily oxidised organic substances.

Another prior art document refers to an apparatus used for the electrochemical treatment of water with the aim of disinfecting and purifying it from toxic organic and chemical substances and containing an electrochemical (electrolytic) cell with coaxially positioned cylindrical and bar-shaped unipolar electrodes (anode and cathode) which are connected to the exit terminals of the supply source and which are separated by a coaxial cylindrical semi-permeable diaphragm. This apparatus also has a feed pipeline for supplying the water being processed to an anode chamber, a midstream flow switching device with a midstream catalytic reactor for breaking down active chlorine, through which reactor the water is passed from the anode chamber of the electrochemical cell into the cathode chamber, and an exit pipeline for passing processed water from the cathode chamber to the place of collection (see, for example, GB 2 257 982).

An analysis of the principle of operation of this apparatus, and an experiment on its use as an ordinary water purifier, showed that its disinfection of slightly-mineralised drinking water with theoretically morbific or morbific bacteria, microorganisms and viruses was irregular, and that pipelines coming into contact with bacterially-contaminated water were themselves becoming contaminated. Therefore they had to be disinfected in order not to allow any additional bacterial contamination of the drinking water which was being purified. Disinfection of the unit was carried out using special chemical mediums, for example a 0.25% solution of sodium hypochlorite. In addition to that, the unit did not purify the water effectively enough from chemical compounds containing iron or heavy metals, and if constructed in the way described above it cannot be used for the electrochemical treatment of other liquid mediums for obtaining sterilising, disinfectant or detergent solutions.

The closest prior art to the present invention is an apparatus for the electrical treatment of water containing at least one midstream diaphragm electrolytic cell with cylindrical and rod-shaped unipolar electrodes, vertically coaxially positioned, which are connected to a source of continuous electrical current and positioned away from both sides of the semi-permeable cylindrical diaphragm which divides the cell into anode and cathode electrode chambers with a feed line for water being processed, and anodic and cathodic outlet lines for processed water, the anodic outlet line being connected with an expansion tank and this last being connected to a midstream catalytic reactor for breaking down active chlorine, from which the dechlorinated anodically-processed water is passed by way of the exit line to the place of collection (WO 93/20014).

This water purification apparatus does not sufficiently thoroughly, effectively or regularly disinfect or purify slightly-mineralised water intended for drinking purposes (with a general salt content of up to 1 g/l and a chloride concentration of up to 50 mg/l) from bacterial microorganisms or toxic organic or chemical substances or compounds (heavy metals or iron); in addition, it lowers the pH and increases the redox potential of the water being processed, which is not always acceptable, for example where the initial pH is in the range of 6 to 7.

During the process of operating this apparatus for disinfecting water from theoretically morbific bacteria, it becomes necessary to disinfect the exit pipeline and other component parts of the apparatus, which is a process which must be carried out using industrially-produced chemical substances.

This at once makes operation of the apparatus more complex and increases its operating costs; however, the disinfection carried out periodically fails to guarantee a high-quality disinfection of bacterially contaminated drinking water, in so far as the process of electrochemically treating the circulating flow of water is not carried out until after the anode and cathode electrode chambers of the electrolytic cell have been filled, and as a result of the varying levels of hydraulic resistance in the feed pipelines (a throttle is positioned in the line through which water is passed to the cathode chamber) the electrode chambers are filled at different rates during initialisation; specifically, the anode chamber is filled more quickly than the cathode chamber.

BRIEF SUMMARY OF THE INVENTION

The invention being proposed seeks to provide the following technical result: an improvement in construction, an increase in functional resources and the use of an apparatus for the electrochemical treatment of a liquid medium for disinfecting and purifying slightly mineralised salt water solution, for example water, and the production of sterilising, disinfecting, decontaminating, bleaching, cleansing and medicinal solutions, for example those having an antibacterial and anti-viral action.

According to a first aspect of the present invention, there is provided an apparatus containing at least one midstream electrolytic cell with unipolar electrodes of positive and negative polarity, which are connected to a source of continuous electrical current and positioned on both sides away from the semi-permeable diaphragm or membrane which divides the cell into anode and cathode electrode chambers with pipelines attached to their nozzles, these pipelines including a feed pipe for the liquid medium being treated, a cathodic outlet pipe with a discharge point for carrying the liquid medium away from the cathode chamber, an anode outlet pipe for carrying the liquid medium from the anode chamber into the catalytic reactor for breaking down active chlorine, an exit line connected to the reactor and with a discharge point for carrying the liquid medium away to the place of collection, also equipped, in accordance with the invention, with a bypass line, an additional exit line with a discharge point, and a flow switching device to which the exit end of the anodic outlet line, in entry nozzle for the catalytic reactor and an entry nozzle for the additional exit line are connected. The bypass line is connected to the exit nozzle of the anode chamber or to its outlet line, or to the flow switching device; and its exit end is connected to the exit line and to the exit nozzle of the catalytic reactor.

The apparatus, together with the above-mentioned pipelines, is also equipped with a connecting line, by means of which the cathodic outlet line is connected with the anodic outlet line.

According to a second aspect of the present invention, there is provided an apparatus for the electrolytic treatment of a liquid medium, the apparatus comprising an electrolytic cell having an anode chamber containing an anode and a cathode chamber containing a cathode, the chambers being separated from each other by a permeable membrane, a feed line for supplying the liquid medium to the anode and the cathode chambers, a cathodic outlet line for carrying, liquid medium away from the cathode chamber to a discharge point, a catalytic reactor, a first anodic outlet line for carrying liquid medium away from the anode chamber and to the catalytic reactor, an exit line connected to the catalytic reactor for carrying liquid medium to a collection point, and a second anodic outlet line for carrying liquid medium away from the anode chamber and to the collection point while bypassing the catalytic reactor.

Advantageously, there is provided a flow switching device to which is connected the first anodic outlet line, an entry line to the catalytic converter and an exit line to a discharge point. There may additionally be provided a connecting line by means of which the first anodic outlet line is connected to the cathodic outlet line.

In addition, a consumption limiter and/or a normally-closed regulator valve or a consumption regulator may be positioned on the second anodic outlet line or bypass line; and consumption regulators may be positioned on the exit end of the cathodic outlet line and/or on the connecting line. The flow switching device may have a manual or electro-magnetic driving gear and may be provided with a connecting element which may have a rotary or reciprocating motion with passage channels for circulation of the liquid medium - when these are in operation the lines connected to the transfer line have links with each other and/or with the catalytic reactor.

The apparatus may also contain a midstream expansion tank, positioned on the end part of the anodic outlet line in front of the flow switching device, and may be equipped with at least one purification filter positioned on the anodic outlet line or on the exit line and/or on the connecting line.

The expansion tank reduces the speed of flow of the circulation of the liquid medium as it is being carried from the anode or cathode chamber of the electrolytic cell to the purification filter or to the dechlorinating catalytic reactor, and a filter with a porous filtration element purifies the electrochemically processed liquid medium of particulate impurities and oxides of iron or hydroxides of alkaline earth or heavy metals.

The apparatus may also be equipped with a water-jet pump measuring device, which has at least one midstream ejector chamber, positioned on the feed line and/or on the connecting branch leading from it, by means of which the liquid medium being processed is carried from the feed line to the cathode chamber. The ejector chamber has at least one inward suction nozzle to which an auxiliary line with a consumption regulator and/or a filter is connected, and the exit end thereof is connected with the anodic or cathodic outlet line or positioned in the reagent solution tank, or has a link with the atmosphere.

The measured supply to the reagent solution ejector chamber, for example sodium chloride mixed with the flow of the liquid medium being processed, increases its electrical conductivity, and this allows the specific consumption of electricity and electric power consumed during the electrochemical treatment of the liquid medium to be reduced. The chlorides or bromides introduced therein are the initial material used for obtaining the specific products of electrolysis, for example oxygen compounds of active chlorine or of active bromine.

The measured supply to the ejector chamber of the recirculating flow of liquid medium processed in the anode or cathode chamber and mixed with the flow of liquid medium being processed, allows a reduction in the cost of its electrochemical treatment in connection with the partial or total reduction in consumption of the liquid medium discharged from the apparatus into the sewerage system, and also allows an increase (regulation) in pH and a reduction in the redox potential of the electrochemically processed liquid medium with the specific products of electrolysis obtained; the specifically intended regulation of the pH and redox potential of the liquid medium is one of the current aims of practical electrochemistry.

The measured supply to the ejector chamber of a lightly-dispersed flow of atmospheric air, mixed with the flow of the liquid medium being processed, allows an increase in the exit; by flow of specific products of electrolysis and/or an intensification of the electrochemical treatment process by improving the circulation of the flow of the liquid medium being processed through the electrode chambers in the midstream electrolytic cell, as well as increasing the efficiency of purification and/or reducing the intensity of precipitation of hydroxides of alkaline earth metals on the cathode-side surface of the cathode and on the surface of the diaphragm or membrane which divides the anode chamber from the cathode chamber; the increase in exit through flow of products of electrolysis and/or the decrease in intensity of formation of cathodic deposits during the electrochemical treatment of the liquid medium is an important condition for the stable operation of the electrochemical apparatus.

The apparatus may also be equipped with a device for measuring and controlling the pH and/or the redox potential of the circulation flow of the liquid medium being processed; the electrodes of this device may be positioned in the midstream expansion tank or in the midstream cell positioned on the end part of the anodic outlet line in front of the flow switch device.

The anode chamber of the electrolytic cell may have three outlets. The feed line is attached to the first of these, the anodic outlet line to the second, and the bypass line or else a diaphragm or membrane electrolytic cell, which is either flat or cylindrical in form and may have a vertical, horizontal or sloping working position, to the third.

The choice of form and preferred working position of the electrolytic cell is determined by its productivity, the density of the anodic or cathodic current which is carried to its electrodes, and also the capacity consumed. In accordance with specialist electrochemical papers and with practical experience, a flat-shaped diaphragm cell is characterised by its simpler and more economical construction as well as by its greater reliability during operation, in comparison with electrolytic cells of similar productivity with electrodes and a cylindrical diaphragm.

According to a third aspect of the present invention, there is provided an apparatus for the electrochemical treatment of a liquid medium, the apparatus comprising at least one midstream electrolytic cell with unipolar electrodes of positive and negative polarity which are connected to a source of continuous electrical current and positioned or both sides away from the semi-permeable diaphragm or membrane, which divides the cell into anode and cathode electrode chambers with pipelines attached to their nozzles, these pipes including a feed line for the liquid medium being processed, a cathodic outlet line with a discharge point for carrying the liquid medium out of the cathode chamber, an anodic outlet line for carrying the liquid medium out of the anode chamber into a catalytic reactor for breaking down active chlorine, an exit line connected with the reactor with a discharge point for carrying the liquid medium to the place of collection, and also equipped with a bypass line, a flow switching line for carrying the liquid medium from the anode or cathode chamber or from its outlet line into another electrode chamber, an additional exit line with a discharge point, and also a flow switching device to which the exit end of the anodic outlet line is connected, an entry nozzle for the catalytic reactor and an entry nozzle for the additional exit line; the feed line is connected to the anode or cathode chamber and the bypass line to the exit nozzle of the anode chamber or to its outlet line, or to the additional exit line, and its exit end is connected with the exit line and with the exit nozzle of the catalytic reactor.

According to a fourth aspect of the present invention, there is provided an apparatus for the electrolytic treatment of a liquid medium, the apparatus comprising an electrolytic cell having an anode chamber containing an anode and a cathode chamber containing a cathode, the chambers being separated from each other by a permeable membrane, a feed line for supplying the liquid medium to the anode chamber or the cathode chamber, a flow switching line for carrying liquid medium from the anode chamber or an outlet line thereof to the cathode chamber or vice versa, a cathodic outlet line for carrying liquid medium away from the cathode chamber to a discharge point, a catalytic reactor, a first anodic outlet line for carrying liquid medium away from the anode chamber and to the catalytic reactor, an exit line connected to the catalytic reactor for carrying liquid medium to a collection point, a second anodic outlet line for carrying liquid medium away from the anode chamber and to the collection point while bypassing the catalytic reactor.

There may additionally be provided a connecting line by means of which the first anodic outlet line is connected to the cathodic outlet line.

In addition, a consumption limiter and/or a normally-closed regulator valve or a consumption regulator may be positioned on the second anodic outlet line or bypass line; and consumption regulators may be positioned on the exit end of the cathodic outlet line and/or on the connecting line. The flow switching device may have a manual or electromagnetic driving gear and may be provided with a connecting element which may have a rotary or reciprocating motion with passage channels for circulation of the liquid medium—when these are in operation the lines connected to the transfer line have links with each other and/or with the catalytic reactor.

The apparatus may also contain at least one midstream expansion tank, positioned on the end part of the anodic outlet line in front of the flow switching device and/or on the flow switching line; at least one purification filter, positioned on the anodic outlet line and/or on the exit line and/or on the flow switching line; a water-jet pump measuring device which has at least one midstream ejector chamber, positioned on the midstream ejector chamber and/or on the feed line, connected with the anode or cathode chamber; a device for measuring and controlling the pH and/or the redox potential of the circulating flow of the processed liquid medium; the anode chamber in the electrolytic cell may have three nozzles, and the electrolytic cell, which is either cylindrical or flat in form, may be placed in a vertical horizontal or sloping working position.

BRIEF DESCRIPTION OF THE DRAWINGS

For a better understanding of the present invention and to show how it may be carried into effect, reference shall now be made, by way of example, to the accompanying drawing, in which.

DETAILED DESCRIPTION OF THE INVENTION

An apparatus for the electrochemical treatment of a liquid medium contains a midstream electrolytic cell with an anode chamber 1 (FIGS. 1 to 9) and a cathode chamber 2, which are divided by means of a semi-permeable element in the form of a diaphragm or membrane 3. The electrolytic cell is flat or cylindrical in shape and has a vertical, horizontal or sloping work position. An electrode of positive polarity (an anode) is positioned in the anode chamber 1, and an electrode of negative polarity (a cathode) is positioned in the cathode chamber 2, these being shown in the diagrams by the corresponding signs ⊕, and ⊖. The electrodes may be flat or cylindrical in shape. They are connected to the terminals of a regulated stabilised transformer source of continuous electrical current, combined with a control box (not shown in the Figures).

Pipelines are connected to the entry and exit nozzles of the anode and cathode chambers 1 and 2 of the flat or cylindrical electrolytic cell, which allows provision for an entry and one or two exit nozzles. Hereinafter, instead of the term "pipeline", the functional term "line", without the term "pipe" shall be used. The apparatus has a feed line 4 for the liquid medium being processed, a cathodic outlet line 5 with a discharge point for carrying the liquid medium away from the cathode chamber 2, an anodic outlet line 6 for carrying the liquid medium away from the anode chamber 1, a flow switching device 7 with a manual or electromagnetic driving gear, a midstream catalytic reactor 8 with a granulated catalyst and/or a sorbent for removal (chemical breakdown and/or sorption) of active chlorine from the processed liquid medium, a bypass line 9, an exit line 10 and an additional exit line 11. The flow switching device 7 has a manual or electromagnetic driving gear. It may be provided with an adjustable element with rotary or reciprocating movement with passage channels for circulation of the liquid medium, for example in the form of a three-way or four-way cock, or with an adjustable rod.

Figure 2:
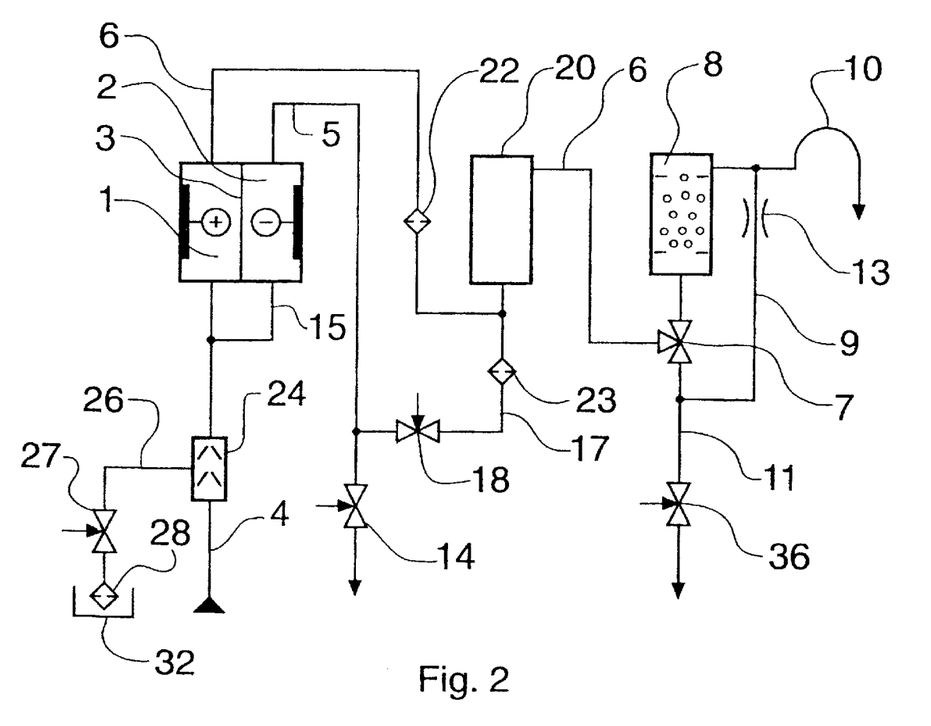
Figure 6:
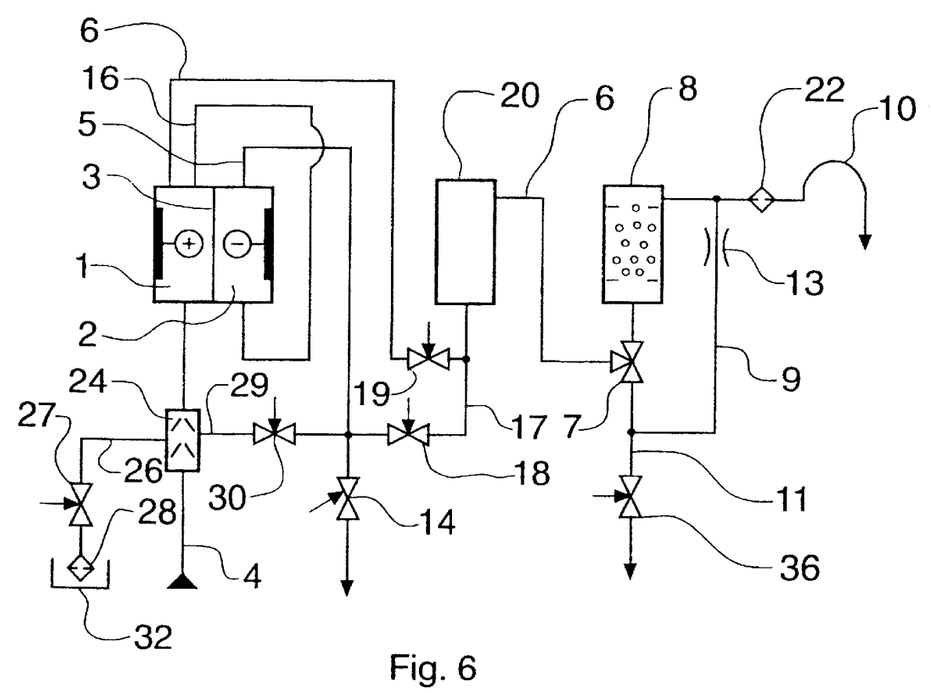
Figure 9:
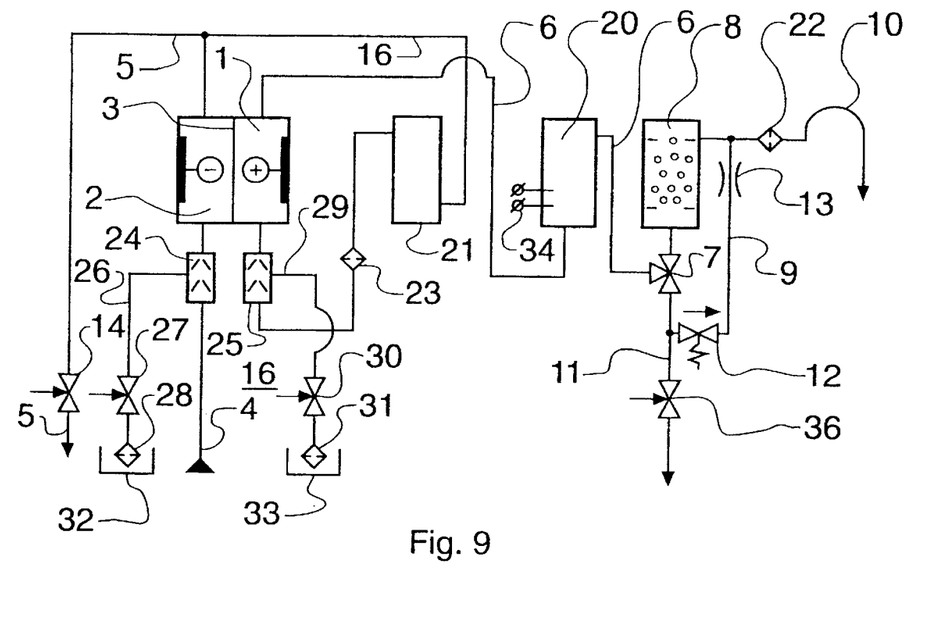

A normally-closed regulator valve 12, as well as a consumption regulator 13, provided in the form of a throttle, are positioned in the bypass line 9. Alternatively, the throttle 13 may be positioned in the body of the regulator valve 12, or a shut-off and regulator valve 12 may be installed, or just a throttle 13 may be positioned on the bypass line (FIGS. 2, 6 and 9).

The entry end of the bypass line 9 is connected with the exit nozzle of the anode chamber 1 (FIGS. 1, 2, 5, 8 and 9), with the anodic outlet line 6 (FIGS. 3, 4, 6 and 7), or with the additional exit line 11 (FIGS. 2, 6 and 9), and the opposite end thereof is connected with the exit line 10 or with the exit nozzle of the catalytic reactor 8. A regulator/shut-off and regulator pipe armature (consumption regulator) 14 is positioned at the exit end of the cathodic outlet line 5, provided in the form of a regulated throttle (FIGS. 1 and 5) or a shut-off and regulator valve (FIGS. 2–4 and 6–9), these being shown in the Figures using the generally accepted standard graphic symbols.

Through the discharge points of the cathodic outlet line 5, the exit line 10 and the additional exit line 11, the processed liquid medium is passed to the place of collection or is discharged, for example into the sewerage system; this is indicated by arrow points at the ends of lines 5, 10 and 11. The supply of the liquid medium being processed into the apparatus is also indicated in the Figures using the generally accepted standard graphic symbols in the form of a solid black triangle at the entry point of the feed line 4.

In apparatus which constitutes a first embodiment of the invention (FIGS. 1–4), the feed line 4 is connected with the entry nozzle of the anode chamber 1 and has an additional feed branch 15 which is connected to the entry nozzle of the cathode chamber 2.

In apparatus which constitutes a second embodiment of the invention, the feed line 4 is connected with the entry nozzle of the anode chamber 1 (FIGS. 5, 6 and 7) or with the entry nozzle of the cathode chamber 2 (FIGS. 8 and 9); therefore there is also a flow switching line 16 for carrying the liquid medium from one chamber of the electrolytic cell, or from the outlet line connected to it, to the other chamber, for example: from the anode chamber 1 (FIG. 6 or from the anodic outlet line 6 (FIGS. 5 and 7) to the cathode chamber 2; or from the cathode-chamber 2 (FIG. 8) or from the cathodic outlet line 5 (FIG. 9) to the anode chamber 1.

Figure 3:
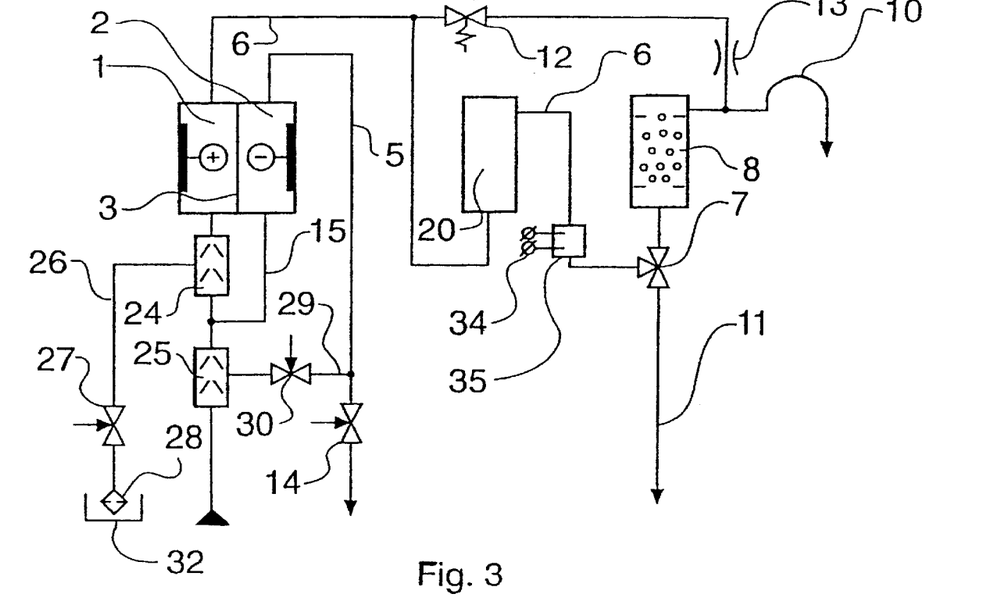
Figure 4:
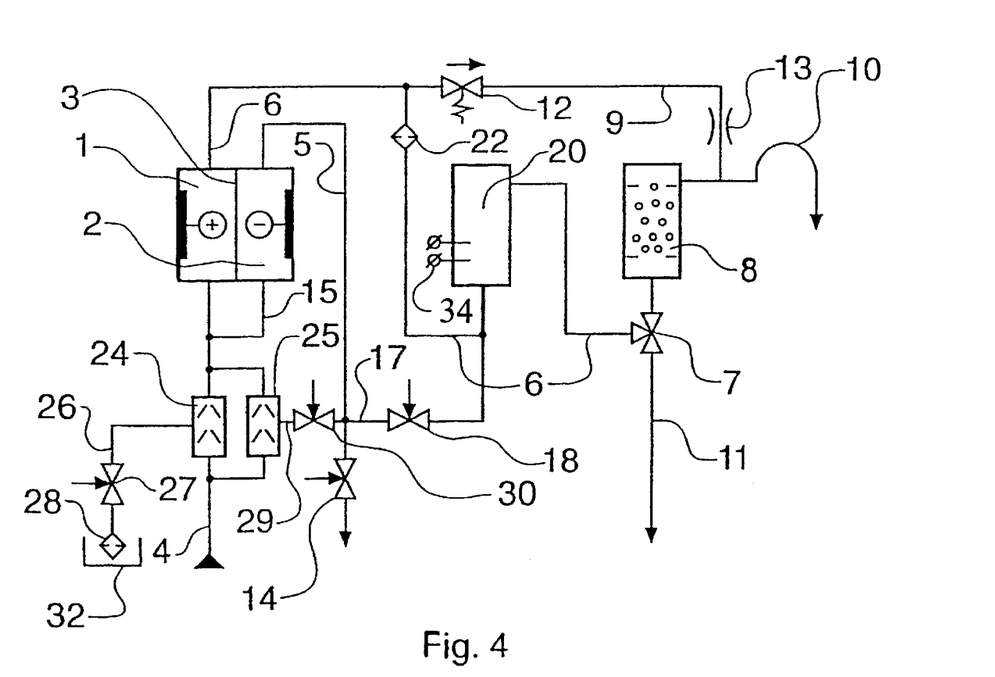
Figure 5:
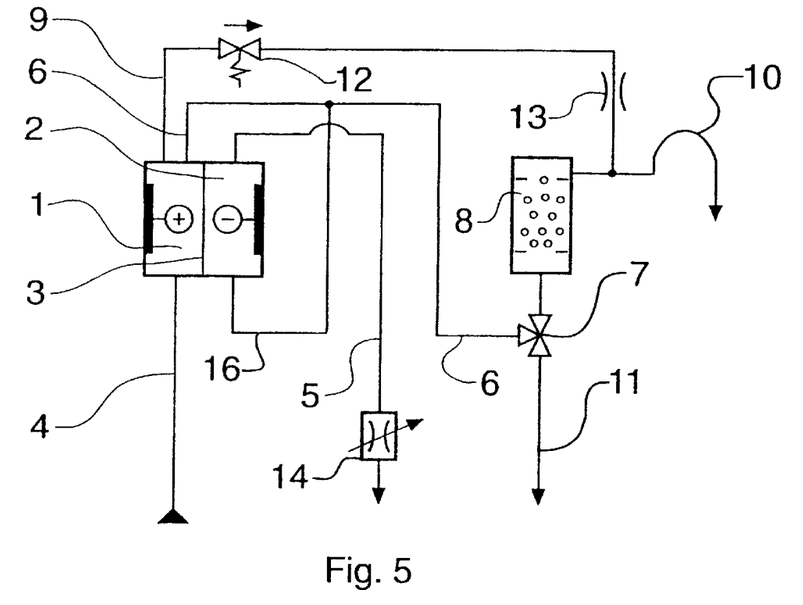
FIGS. 5 to 9 show the principal hydraulic circuits in the apparatus for the electrochemical treatment of a liquid medium, in accordance with a second embodiment of the invention.
Figure 7:
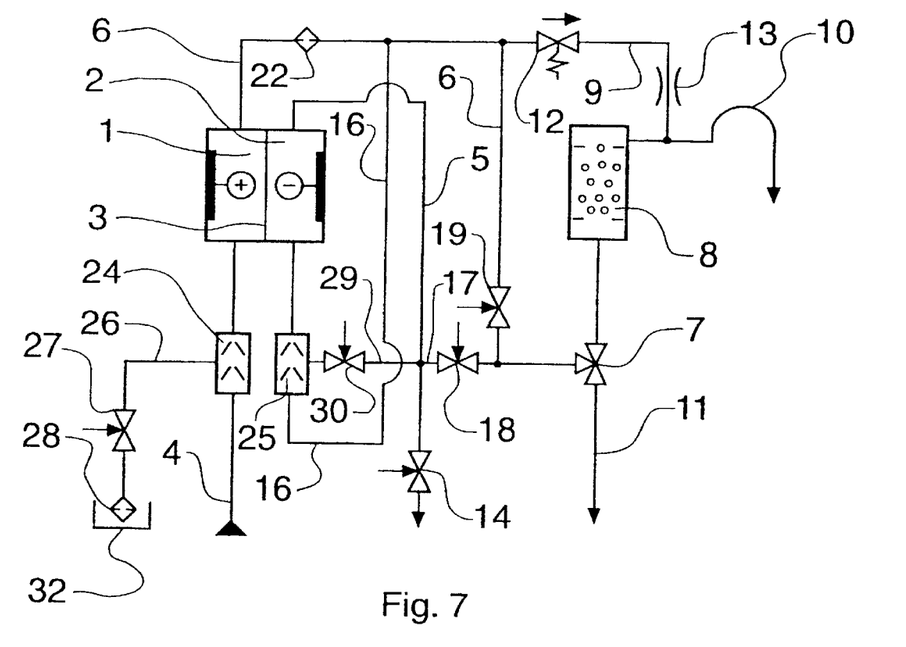

The apparatus which constitutes the first embodiment of the invention, in accordance with FIGS. 2, 3 and 4, or the second embodiment in accordance with FIGS. 6–9, also has the following additional elements in combination with the basic elements listed above, which are indicated by reference numerals 1–15 in FIG. 1 or 1–14 and 16 in FIG. 5:

a connecting line 17, which connects the cathodic outlet line 5 with the anodic outlet line 6 (FIGS. 2, 4, 6 and 7);

a shut-off and regulator valve 18, positioned on the connecting line 17 (FIGS. 2, 4, 6 and 7) and a valve 19 positioned on the anodic outlet line 6 (FIGS. 6 and 7);

a through-flow expansion tank 20 and/or 21 for reducing the speed of circulation of the liquid medium being carried from the anode chamber 1 to the midstream catalytic reactor 8, or from the cathode chamber 2 to the anode chamber 1, the expansion tank 20 being positioned on the end part of the anode outlet line 6 in front of the flow switching device 7 (FIGS. 2, 3 and 4), and the expansion tank 21 being positioned on the flow switching line 16 (FIG. 9);

a purification filter 22 for purifying the liquid medium from precipitations of iron oxide, positioned on the anodic outlet line 6 (FIGS. 2, 4, 6 and 7), and/or on the exit line 10 (FIGS. 6, 8 and 9) and/or a purification filter 23 for purifying the liquid medium from precipitations of hydroxides of alkaline earth and heavy metals, positioned on the flow switching line 16 (FIGS. 8 and 9) and/or on the connecting line 17 (FIG. 2). Depending on the proposed purpose and the sphere of application of the apparatus, provision may be made for other variations in the position of one or more of the purification filters on lines connected to each other, along which the liquid medium is carried from the electrode chambers of the electrolytic cell to the place of collection or discharge; and a water-jet pump measuring device with a midstream ejector chamber 24, positioned on the feed line 4

Figure 8:
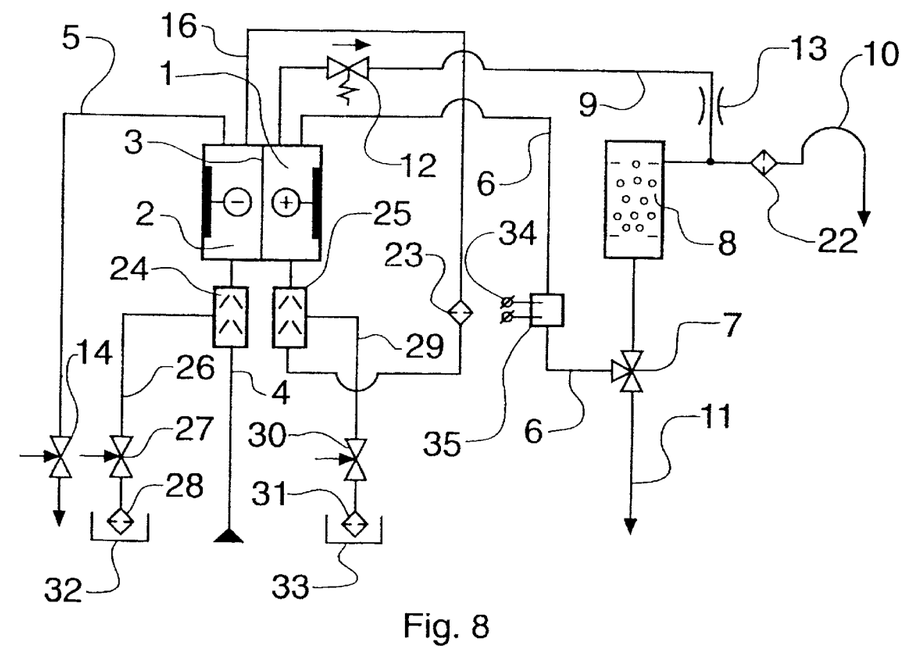

(FIGS. 2 and 6–9), or with two ejector chambers 24 and 25 which may be positioned on the feed line 4 in sequence (FIG. 3) or in parallel (FIG. 4); or else the ejector chamber 25 may be positioned on the flow switching line 16 (FIGS. 7, 8 and 9). The ejector chambers 24 and 25 have one or two inward suction nozzles, to one of which an auxiliary line 26 connected with a shut-off and regulator valve 27 and a filter 28 (FIGS. 2, 3, 4, 6, 7, 8 and 9), and to the other of which an auxiliary line 29 is connected with a shut-off and regulator valve 30 and/or a filter 31 (FIGS. 3, 4, 6, 7, 8 and 9).

The entry end of the auxiliary line 26 with the filter 28 is placed in a reagent solution tank 32 or has a link with the atmosphere, while the entry end of the auxiliary line 29 may be connected with the cathodic outlet line 5 (FIGS. 3, 4, 6 and 7) or with the anodic outlet line 6 (not shown in the Figures) or the filter 31 positioned thereon is placed in a reagent solution tank 33 (FIGS. 8 and 9). The auxiliary tanks 32 and 33 are shown on the Figures for the convenience of showing the principles of operation of the apparatus. The filters 28 and 31 are intended for purifying the reagent solution and/or the air from particulate impurities. The technical results achieved from the ejector chambers 24 and 25 are shown above and in addition are discussed in the further description of the principles of operation of the apparatus, along with examples for its practical use.

The apparatus may also contain a device for measuring and controlling the pH and/or the redox potential of the circulating flow of the processed liquid medium. This device has electrodes 34, which may be positioned in the midstream expansion tank 20 (FIGS. 4 and 9) or in a midstream cell 35 positioned on the end part of the anodic outlet line 6 in front of the flow switching device 7 (FIGS. 3 and 8).

When the bypass line 9 with the throttle 13 is connected to the flow switching device 7 (FIGS. 2, 6, 9 and 13) and/or to the additional exit line I 1, this last is equipped with a cock or shut-off and regulator valve 36.

Figure 1:
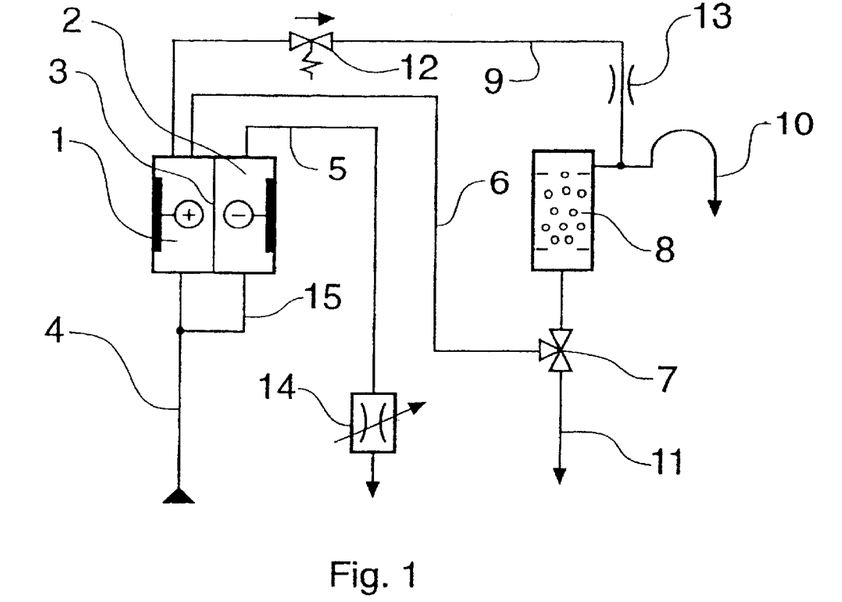
FIGS. 1 to 4 show the principal hydraulic circuits of the apparatus for the electrochemical treatment of a liquid medium, in accordance with a first embodiment of the invention.

The principle of operation of the apparatus is as follows:

In the apparatus which constitutes the first embodiment of the invention, as shown in FIG. 1, the liquid medium being processed, for example water or sodium chloride solution, is carried along the feed line 4 (and the branch 15 leading away from it) into the anode chamber 1 or into the cathode chamber 2 of the electrolytic cell in which the unipolar electrodes are positioned. The anode, having positive polarity, and the cathode, having negative polarity, are separated by means of a semi-permeable element 3 in the form of a diaphragm or membrane. In the electrode chambers of the electrolytic cell, the liquid medium is subjected to anodic or cathodic electrochemical treatment by a continuous electrical current, which is passed from the source of current to the anode 1 and the cathode 2. The electrochemically treated liquid medium is characterised by the generally accepted terms "anodically-treated liquid medium" and "cathodically-treated liquid medium".

In the anodically-treated liquid medium, the anodic products of electrolysis are formed, for example hydrochloric acid in a complex with oxygen compounds of active chlorine (hypochlorite ions, hypochloric acid, chlorine monoxide), and the basic gases produced during electrolysis (chlorine, oxygen and ozone) At a pH of less than 7, oxidised iron-containing chemical compounds are precipitated out in the form of non-water-soluble oxides.

In the cathodically-treated liquid medium, the cathodic products of electrolysis are formed, for example peroxides, elementary hydrogen and hydroxides of alkaline, alkaline earth or heavy metals. With certain pH values, non-water-soluble hydroxides of alkaline earth and heavy metals form a precipitate which can be removed by straining the liquid medium through a filter with a porous straining element, for example with a pore dimension of 5–10 $\mu$m.

Figures 10, 11, 12, 13:
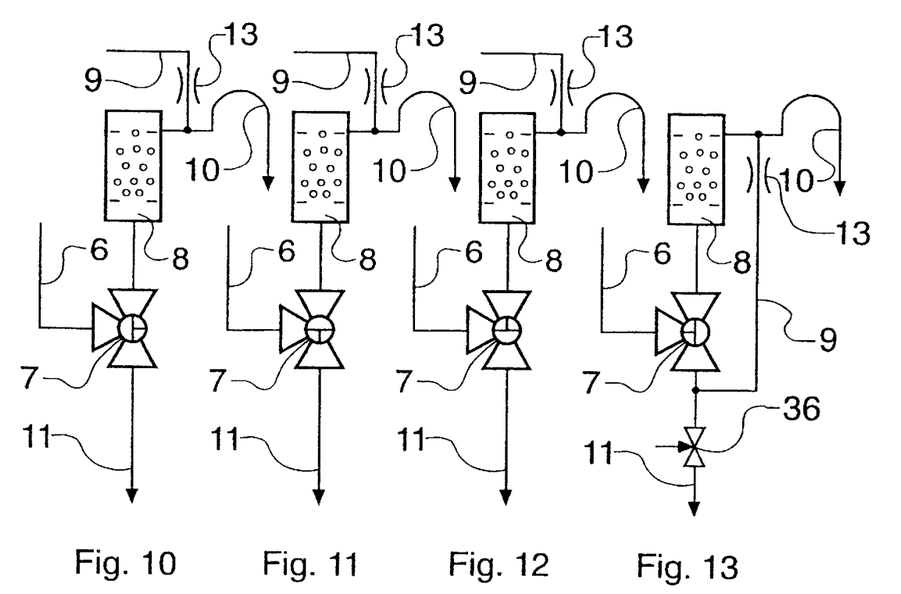
FIGS. 10 to 13 show the working positions of the flow switching device, completed in the form of a three-way cock with pipelines and a catalytic reactor for breaking down active chlorine.

From the cathode chamber 2, the cathodically-treated liquid medium is carried away along the cathode outlet line 5 with a valve or regulating throttle 14 to the place of collection or discharge, and the route along which the anodically-treated liquid medium is carried away from the apparatus is determined by the work position of the flow switching device (FIGS. 10–13). With the flow switching device 7 in a work position as shown in FIGS. 11 and 12, the normally-closed regulator spring-loaded valve 12 cuts off the supply of anodically-treated liquid medium to the bypass line 9. Therefore the liquid medium travels from the anode chamber 1 to the anodic outlet line 6, from which, depending upon the working position of the flow switching device 7, it is carried either into the additional exit line 11 (FIG. 11) and poured into (for example) a storage tank or removed to the sewerage system, or into the catalytic reactor 8 (FIG. 12) in which it is dechlorinated and transported along the exit to the place of collection.

With the flow switching device in a work position as shown in FIG. 10, the apparatus works in exit line 10 and catalytic reactor 8 disinfection mode; in so far as the supply of the liquid medium to the flow switching device 7 from the anodic outlet line 6 is cut off, the anodically-treated liquid medium with its bactericidal compounds of active chlorine and other products of electrolysis is carried along the bypass line 9 with an open valve 12 or with a spring-loaded regulator valve 12 and a throttle 13 into the exit line 10. It disinfects the exit line 10 and passes out through the discharge point of the line into the sewerage system and simultaneously enters the catalytic reactor 8. The reactor also undergoes disinfection as the liquid medium dechlorinated inside it is passed into the additional exit line 11, from which it is poured into the sewerage system. The first embodiment of the apparatus, as shown in FIG. 2, has a similar principle of operation, with the transportation of the anodically-treated liquid medium to the exit line 10 during its disinfection having the following specific feature: the anodically-treated liquid medium is carried from the anode chamber 1 along the anodic outlet line 6 with a purification filter 22 into the expansion tank 20, from which, with the flow switching device 7 in a working position as shown in FIG. 1, it enters the additional exit line 11 with a cock or shut-off valve 36 and then passes through the bypass line 9 with a throttle 13 into the exit line 10. For discharging the liquid medium from the apparatus, the flow switching device is set in a working position as shown in FIG. 13.

The apparatus of the first embodiment on the invention, with basic and additional component parts as shown in FIGS. 3 and 4, works (on the whole) according to the same principles as the apparatus as shown in FIG. 1. The additional component parts, indicated on FIGS. 3 and 4 at positions 17, 18, 20, 22, 24–30 and 32, ensure that the apparatus can perform the same particular functions in both the first and second embodiment, depending upon the constructional varieties of the hydraulic circuits which allow one and the same technical result to be obtained.

The principle of operation of the second embodiment (FIGS. 5–9) is distinguished from the principle of operation of the first embodiment in that the liquid medium being processed is carried along the feed line 4 into the anode chamber 1 (FIGS. 5, 6 and 7) or into the cathode chamber 2 (FIGS. 8 and 9), and then along the flow switching line 16 into the other chamber: from the anode chamber 1 into the cathode chamber 2 (FIGS. 5, 6 and 7) or from the cathode chamber 2 into the anode chamber 1 (FIGS. 8 and 9).

A detailed description of the principle of operation of the first and second embodiments of the apparatus is made in the practical examples examined below.

EXAMPLE 1

The Disinfection of Water Intended for Drinking Purposes with a Reduction in the Initial Quantity of Lightly-oxidisable Organic Substances and Chemical Compounds of Iron The proposed apparatus, the first embodiment of which is shown in FIGS. 3 and 4, operates in the following way.

During the initial working period of the apparatus, disinfection of the anode outlet line 6 with the expansion tank 20 and flow switching device 7, as well as the catalytic reactor 8 and the exit line 10 connected thereto, is carried out. A supply source, combined with a control box, is connected to the electrical network, a potential difference is applied across the electrodes in the electrolytic cell and the flow switching device 7 is set in the working position as shown in FIG. 10. The normally-closed electromagnetic valve (not indicated on the figures), positioned on the entry end of the feed line 4 with an additional feed line 15, is then opened; the water being processed passes through it, enters the anode chamber 1 and, through the branch 15 leading away there from, also enters the cathode chamber 2. During the circulation process along the feed line 4 through the sequentially positioned (FIG. 3) or parallel (FIG. 4) ejector chambers 24 and 25 of the water-jet pump measuring device, the flow of the water being processed sets up a rarefying process in the ejector chambers and because of this the flow of cathodically-treated water carried away from the cathodic line 5 along the auxiliary line 29 with valve 30, also enters the ejector chamber 25. A 1% solution of sodium chloride or atmospheric air is sucked out of the tank 32 (partly filled with solution) through the auxiliary line 26 with valve 27 and filter 28, and is passed from the tank 32 into the ejector chamber 24. If the initial water has a pH of 8–9, then in order to increase the efficiency of its disinfection and purification, the reagent 1% sodium chloride solution is acidified by obtaining anodically-treated water with a pH of 5–6. The shut-off and regulator valves 27 and 30 regulate the consumption of reagent solution and/or cathodically-treated water, or atmospheric air, introduced into the ejector chamber, and when it is not necessary to introduce these, the auxiliary line 26 and/or 29 is closed off.

The addition of the 1% sodium chloride solution to the intended drinking water being treated is carried out using the acceptable concentration of 350 mg/l which is laid down by the requirements of GOST 2874-82 "Drinking Water", and the amount of atmospheric air introduced is regulated by the amount of electrolytic gases given off in addition, insofar as their total surplus quantity is applied to the essential increase in tension in the current flowing at the point of electrolysis, by the amount of electricity consumed and by the electric power consumed during the electrochemical treatment of the water.

To obtain stable concentrations of active chlorine and ozone in water being electrochemically treated with an average salinity of 0.1 to 1.0 g/l and a chloride concentration of up to 50 mg/l, a 1% solution of sodium chloride is added based on the total chloride concentration of 150 mg/l, and its treatment is carried out using a current of 500 to 750 mA with a potential difference of 10–12 volts. Where it is necessary to adjust the pH of the water being processed in the anode or cathode chambers 1 and 2 of the electrolytic cell, the 1% solution of sodium chloride or other reagent solution is acidified, for example by the addition of acetic or hydrochloric acid, or is made more alkaline by the addition of sodium bicarbonate; the optimum pH parameters for anodically-treated water are 6–7, and for cathodically-treated water 8–9. By recirculating the flow of cathodically-treated water mixed with a flow of water still being treated, with the help of the ejector chamber 25, the cost of electrochemically treating the liquid medium is lowered (because less, or even none, of the liquid medium has to be discharged into the sewers) and also allows an increase in the pH and a reduction in the redox potential of the drinking water transported to the point of collection. Thus, for example as a result of anodic electrochemical treatment of water with a redox potential of +300 to +330 mV at a pH of 7.6—7.6 with a current of 500–750 mA, the pH is reduced to 6.8–7.0 and the redox potential increased to +400 to +430 mV. At the same time, the pH of the cathodically—treated water increases to 8.6–8.8 with a simultaneous reduction in redox potential, and the recirculation and measured mixture of flows of cathodically-treated water and water still being treated, in a volume ratio of 1:1 or in other regulated volume ratios, allows an increase in the pH for water being carried from the anode chamber, with a simultaneous reduction in redox potential.

In the anode and cathode chambers 1 and 2 of the electrolytic cell with a semi-permeable diaphragm or membrane 3, a continuous electrical current is passed through the water being processed and applied to the unipolar electrodes positioned in the cell; to the anode, of positive polarity, and to the cathode, of negative polarity.

Under the action of the continuous electrical current, the water circulating through the electrode chambers 1 and 2 is subjected to electrochemical treatment (electrolysis) with anodic electrochemical reactions occurring in the anode chamber 1 and cathodic electrochemical reactions occurring in the cathode chamber 2.

As a result of these electrochemical reactions, anodic and cathodic products of electrolysis and elementary gases are formed: oxygen compounds of active chlorine, for example in the form of hypochlorite ions, hypochloric acid, chlorine monoxide, hydrochloric acid, chlorine, oxygen and ozone in the anode chamber 1 and sodium hydroxide, calcium, magnesium, heavy metals, peroxides and hydrogen in the cathode chamber 2.

With a pH value for the cathodically-treated water, for example, in excess of 8.5–9.0, the non-water-soluble hydroxides of alkaline earth and heavy metals precipitate out; and in anodically-treated water with a pH not exceeding 7.2, a flaky precipitate of non-water-soluble oxides or iron forms; the higher the pH of the cathodically-treated water and the lower the pH of the anodically-treated water, the higher the overall concentration of hydroxides and oxide,, which precipitate out. Account must be taken of an additional period of time which is necessary for the flaky particles of the precipitate to enlarge with the aim of removing them from the water by filtration or by settling. In order to increase the time taken for the processed liquid medium to circulate from the anode chamber 1 in the electrolytic cell to the purification filter 22 or to the catalytic reactor 8, an expansion tank 20 is provided. At the stage where the anodic electrochemical reaction occurs, and as a result of the high reaction level of the concentrations of ozone and active chlorine compounds formed in the water, the water is subjected to disinfection with a decrease in the overall amount of microorganisms contained therein, or the initial level of pathogenic microorganisms is lowered (theoretically morbific and/or morbific microorganisms are eliminated fully or their initial quantity is lowered), but with an overall concentration of active chlorine and ozone of 3–5 mg/l and more, the anodically-treated water with a pH of no more than 7.0–7.2 is subject to bactericidal action. In connection with this, it is an effective means of disinfection for carrying out anti-microbe treatment on the pipelines and other elements in the apparatus proposed.

The overall concentration of active chlorine and ozone required for disinfecting the apparatus is obtained by regulating the strength of the current, for example in the range of 750–1000 mA, and/or the consumption of anodically-treated water, for example 10–15 l/h, as well as by stabilising these parameters. In order to achieve this, there is provided a regulated transformer source of continuous electrical current combined with a control box, and on the entry end of the feed line 4, by the side of the normally-closed electromagnetic valve, special technical devices are positioned for regulating, stabilising and controlling the consumption of water, for example a shut-off and regulator valve, a pressure regulator and sensor, and/or a rotameter. These generally known technical devices are not indicated in the Figures.

At the same time as the anodically-treated water is disinfected, or its level of contamination by microbes is lowered, other indices relating to its quality are improved, this being determined by the reduction in the amounts of easily oxidisable organic substances and other easily oxidisable pollutants or impurities in the water, as well as an increase in the concentration of dissolved or elementary oxygen. Two flows are carried away from the anode and cathode chambers: it was shown earlier that the flow of cathodically-treated water carried away from the cathode chamber 2 is carried to the ejector chamber 25 and/or discharged from the apparatus through the valve 14 positioned on the exit end of the cathodic outlet line 5, while the flow of anodically-treated water with ozone and bactericidal compounds of active chlorine is carried along the bypass line 9 into the exit line 10. This flow disinfects the exit line 10, the catalytic reactor 8, the flow switching device 7 and the additional line 11, and is discharged from the apparatus by way of the discharge point of the line 11 and the exit line 10.

Disinfection of the exit line 10, the catalytic reactor 8, the flow switching device 7 and the additional exit line 11 is carried out in 20–30 seconds (a time relay is provided in the control box); after this time, the flow switching device is placed in a working position as shown in FIG. 11 and during the following 20–30 seconds disinfection of the anodic outlet line 6 and the expansion tank 20 is carried out. The anodically-treated water is carried out of the anode chamber 1 into the anodic outlet line 6, enters into the expansion tank 20 and then, through the flow switching device 7 and the additional line 11, is discharged from the apparatus.

For the period of work time in the above-mentioned cycle, disinfection of the apparatus is established by a stable regime of electrochemical water treatment. For subsequent water disinfection and purification work regimes in the apparatus, the strength of current on the front panel of the control box is established by a regulator at 500–750 mA, and the flow switching device 7 is set in the work position as shown in FIG. 12. With this, the electrochemically treated water is carried from the anodic outlet line 6 (FIG. 3) and/or from the anodic outlet line 6 and the connecting line 17 (FIG. 4) through the expansion tank 20 and the flow switching device 7 into the catalytic reactor 8, whereupon the valves 14 (FIG. 3) and/or 183 (FIG. 4) cut off the transportation of water through the pipelines 5 and/or 17, or regulate water consumption in order to change the ratio of flows of water being mixed between the anodic and/or cathodic products of electrolysis being carried into the expansion mixing tank 20 from the anodic outlet line 6 and the connecting line 17; the pH and/or the redox potential of the electrochemically treated water transported through the expansion tank 20 and the flow transfer device 7 into the catalytic reactor 8 is regulated using the measured mixture of water flows with anodic and/or cathodic products of electrolysis, and control of these parameters is achieved with the help of a measuring device provided in the apparatus in the form of a midstream pH-meter with electrodes 34 positioned in the midstream cell 35 (FIG. 3) or in the expansion tank 20 (FIG. 4). On the front panel of the control box is a luminous display on which the numerical indices of the pH and redox-potential of the parameters being controlled for the processed liquid medium are indicated, as well as the strength and/or potential difference of the current being passed through the electrolysis area. In the catalytic reactor 8, the water being electrochemically treated for drinking purposes is dechlorinated with a simultaneous lowering of the concentration of ozone; residual concentrations are permissible for free chlorine up to 0.5 mg/l, for bound chlorine up to 1.2 mg/l and for ozone up to 0.3 mg/l. This is laid down by the requirements of GOST 2874-82 "Drinking Water".

During the catalytic breaking down of oxygen compounds of active chlorine, atomic oxygen is given off. This oxygen is expended on oxidising the easily oxidisable substances and/or impurities, iron-containing compounds or microorganisms remaining in the water to sufficient levels. From the catalytic reactor 8, the dechlorinated electrochemically treated water enters the exit line 10 which is provided with a filter 22. The filter 22 holds back the nonwater-soluble oxides of iron which have precipitated out (FIGS. 2, 8 and 9). After that, the purified water is carried through the discharge point of the exit line 10 to the place of collection.

To stop the apparatus from operating during the water disinfection and purification regime, a "Stop" button on the front panel of the control box is pressed. An electromagnetic valve on the entry end of the feed line 4 will then cut off the supply of water being processed to the electrode chambers in the electrolytic cell, after which it will be de-energised. To discharge all the water from the apparatus, the flow switching device 7 is successively put into its working position as shown in FIG. 10 and into its working position as shown in FIG. 11 In this way, water intended for drinking purposes or water with an additionally introduced concentration of chlorides is subjected to electrochemical processing in the first embodiment of the apparatus as shown in FIGS. 3 or 4 so that three flows sent to the place of collection or pouring away can be obtained. These three flows comprise:

i) slightly alkaline water with cathodic products of electrolysis, the concentration of which determines its pH and redox potential, as well as the overall total of non-water-soluble hydroxides of alkaline earth and heavy metals which have precipitated out, ii) slightly acidic or neutral water with anodic products of electrolysis, the composition and concentration of which determines its pH and redox potential, it has a pH of 6.0–7.2, a redox potential of +350 to +450 mV, improved bacteriological indices, a higher oxygen content, and a lower content of iron, easily oxidisable organic substances, chemical compounds and impurities in comparison with original water, and is obtained by way of a closed valve 14 (FIG. 3) and/or 18 (FIG. 4) and carried away through the discharge point of the exit line 10; and iii) slightly alkaline dechlorinated water with a mixture of anodic and cathodic products of electrolysis, the composition, ratio and concentration of which determines its pH and redox potential; it has a pH of 7.8–8.2, a redox potential of +100 to −100 mV, improved bacteriological indices, a higher oxygen and hydrogen content and a lower content of easily-oxidisable organic substances, chemical compounds or impurities in comparison with the original water; and is obtained by way of open valves 18 and/or 30 on the auxiliary line 29 (FIG. 3) and/or on the connecting line 17 (FIG. 4) by carrying away through the discharge point of the exit line 10.

Obtaining a Slightly Acidic, Neutral or Slightly Alkaline Solution of Active Chlorine, as Well as a Slightly Alkaline Solution of Sodium Hydroxide, by an Electrochemical Process The apparatus, as shown in the FIGS. 3 or 4, operates in a similar way to the technical cycle described above, the flow transfer device 7 being set in the work position as shown in FIG. 11.

A 20–30% reagent solution of sodium chloride is poured into the tank 32; a "system" button on the front panel of the control box is pressed in order to apply a potential difference across the electrodes in the electrolytic cell, and the entry valve on the feed line 4 (not shown in the Figures) and the valve 27 regulate the flow of water being processed and the 20–30% sodium chloride solution being mixed with it so as to obtain in the ejector chamber 24 a diluted 1% solution of sodium chloride. The required concentration of diluted solution (10 g/l) in thus ejector chamber 24 is obtained by controlling the potential difference and the strength parameters for the current passing through this chamber when electrochemical treatment is in progress; for example, during the processing of a 1% solution of sodium chloride with a continuous electrical current of 10 A, the tension equals 12 volts.

The electrochemically treated solutions obtained in the electrode chambers 1 and 2 are carried away in the form of two flows, discharged from the apparatus through an open valve 14 on the exit end of the cathodic outlet line 5 and through the discharge point of the additional exit line 11. The valves 14 and 30 (FIGS. 3 and 4) and/or 18 (FIG. 4) regulate the volume ratios of the currents of liquid medium being mixed between anodic and cathodic products of electrolysis, with simultaneous control of the pH and/or redox potential parameters being read on the indicator with lighted figures positioned on the front panel of the control box.

As a result of the electrochemical treatment of the 1% solution of sodium chloride in the electrolytic cell of the apparatus as shown in FIG. 3 or 4, the following are obtained:

i) a slightly alkaline solution of sodium chloride with sodium hydroxide, peroxide compounds and hydroxides of alkaline earth and heavy metals precipitated out; the solution has a pH of 9 to 12 and a redox potential of −600 to −900 mV, is intended for use as a detergent, and is obtained with the valve 14 open and carried out through the discharge point of the cathode outlet line 5;

ii) a slightly acidic solution of sodium chloride with active chlorine in the form of hypochloric acid, chlorine monoxide and elementary chlorine; the solution has an active chlorine concentration of 0.1–0.5 g/l, a pH of 2 to 4 and a redox potential of +950 to +1250 mV; it is intended for use as a disinfectant or decontaminant and is obtained with the valve 30 on the auxiliary line 29 closed, with supply to the place of collection being made through the discharge point of the additional exit line 11; and iii) a slightly acidic, neutral or slightly alkaline solution of sodium chloride with active chlorine in the form of hypochlorite ions, hypochloric acid, chlorine monoxide and elementary chlorine; the solution has an active chlorine concentration of 0.3 to 1 g/l, a pH of 4.5 to 7.5, and a redox potential of +750 to +1050 mV; it is intended for use as a sterilising solution, disinfectant, decontaminant, detergent or medicine, for example as an anti-bacterial or antiviral agent, and is obtained with the valves 18 and/or 30 open on the connecting line 17 and on the auxiliary line 29 with supply to the place of collection being made through the discharge point outflow of the additional exit line 11.

EXAMPLE 2

Disinfection and Purification of Water Intended for Drinking Purposes

The apparatus being proposed, the second embodiment of which is shown in FIGS. 6 or 7, 8 or 9, works in the following way.

In the second embodiment on the apparatus, with sequentially connected electrode chambers, the water being treated initially fills the anode chamber 1 (FIGS. 6 and 7) or the cathode chamber 2 (FIGS. 8 and 9), and then enters the second chamber in the electrode cell through the flow switching line 16. Insofar as the electrochemical treatment of water starts from the moment when both chambers of the electrolytic cell are filled (in the absence of water in the anode chamber no current passes between the electrodes), during the initial period of operation of the apparatus as shown in FIGS. 6 and 7, the untreated water enters the anodic outlet line 6 and together with any organic and/or chemical pollutants may also contain morbific microorganisms. These microorganisms are deposited on the inner surface of the pipelines which have elements positioned on them and through which the flow of bacterially contaminated water is passed to the place of collection. The inner surfaces of the apparatus may thus be subject to contamination during the initial or final period of operation if the circulation of water being processed originates from a de-energised supply source. Therefore the initial cycle of disinfection and purification of the inner surfaces of the apparatus from pollutants already present or brought in during operation is an important prerequisite for high-quality disinfection and purification of water that may contain morbific microorganisms.

The disinfection and initial purification cycle of the apparatus is carried out in a similar way to that described above in Example 1. The pH of the water being treated is from 6 to 9, the initial redox potential +300 to +400 mV, consumption 10–15 l/h, the overall concentration of chlorides already contained or additionally introduced 150 mg/l, the strength of current 750–1000 mA with a potential difference of 12–14 volts, and the overall time required for disinfection 40 to 60 seconds.

For disinfection of the apparatus as shown in FIG. 6, the flow switching device is set in the working position as shown in FIG. 11. For 20–30 seconds the apparatus works with the valve 36 open for discharging water through the additional exit line 11, and then for the next 20–30 seconds with the valve 36 closed in order that anodically treated water with bactericidal compounds of active chlorine and ozone can be passed through the additional exit line 11 and the flow switching device 7 through the bypass line 9 with a throttle 13 into the exit line 10 with a filter 22 and into the exit nozzle of the catalytic reactor 8.

For disinfection of the apparatus as shown in FIG. 7, the flow switching device 7 is; set in the working position as shown in FIG. 10, and then after 20–30 seconds in the work position as shown in FIG. 1. Successive operation of the apparatus as shown in FIGS. 6 or 7 in the water disinfection and purification regime is carried out with the flow transfer device 7 set in a work position as shown in FIG. 12.

During circulation through the anode chamber 1, the flow of water being treated is disinfected in this chamber by the products of electrolysis formed in the chamber (active chlorine, ozone), with a simultaneous lowering of easily-oxidisable organic substances and precipitation of oxides or iron. From the anode chamber 1, the flow of anodically treated water is transported along the anodic outlet line 6 with the valve 19 open through the flow switching device 7 into the expansion tank 20, and along the flow switching line 16 into the cathode chamber 2 (FIG. 6) from which it enters the cathodic outlet line 5 with discharge through an open valve 14 and/or with supply to an expansion tank 20 through an open valve 18 on the connecting line 17 (FIG. 6).

In the apparatus as shown in FIG. 7, the flow of anodically treated water is subjected to purification from oxides of iron in the filter 22 on the anodic outlet line 6, from which it passes into the flow switching device 7 and is carried along the flow transfer line 16 into the cathode chamber 2. In this way, the following may be carried through the flow switching device 7 into the catalytic reactor 8: a flow of slightly acidic or neutral water, for example with a pH of 6 to 7 and a redox potential of +300 to +450 mV, treated in the anode chamber 1; or a mixed current of neutral or slightly alkaline water, for example with a pH of 7 to 9 and a redox potential of +100 to −200 mV, treated initially in the anode chamber 1 and then in the cathode chamber 2. The water dechlorinated in the catalytic reactor 8 is carried along the exit line 10 to the place of collection, and may be subjected to purification by filtration in the filter 22 (FIG. 6) from hydroxides of alkaline earth or heavy metals or oxides of iron which have precipitated out (depending on the pH).

In the apparatus as shown in FIG. 8 or 9, the dechlorination and purification of water is carried out with the valve 14 closed on the cathodic outlet line 5; the flow of water treated in the cathode chamber 2 is initially subjected to purification by filtration in the filter 23 from hydroxides of alkaline earth and heavy metals which have precipitated out, and then to anodic treatment in the anode chamber 1 with the aim of disinfecting the water by lowering the overall quantity of easily-oxidisable organic and chemical substances, after which it is dechlorinated in the catalytic reactor 8 and again subjected to purification by filtration in the filter 22 on the exit line 10 from oxides of iron which have precipitated out.

The drinking water which has undergone disinfection and additional purification is carried along the exit line 10 to the place of collection; for its qualitative disinfection in the anode chamber after preliminary cathodic treatment in the cathode chamber 2, the consumption of water being treated and the strength of the current flowing through it are regulated by obtaining in the anode chamber an overall concentration of active chlorine and ozone of not less than 5 mg/l, which is determined by the potassium-iodine titration method for the sample taken for analysis. Taking this into account, the cathodically treated and slightly alkaline water circulating through the ejector chamber 25 with, for example, a pH of 8.5–11.0 is mixed with an acidified 1% sodium chloride solution carried along the auxiliary line 29 with the valve 30 open in order to obtain an optimum concentration of chlorides, for example 140–160 mg/l in mixed flow, and a lowering of the pH to 6.8–7.2.

Obtaining a Slightly Acidic, Neutral or Slightly Alkaline Solution of Active Chlorine Electrochemically The apparatus as shown in FIGS. 6 and 7 or in FIGS. 8 and 9 works in a similar way to the cycle described above; the flow switching device is in the working position as shown in FIG. 11, and the 1% solution of sodium chloride obtained in the ejector chamber 24 by means of a measured introduction of a 20–30% solution of sodium chloride into the flow of drinking water circulating through the chamber 24, is subjected to electrochemical treatment.

The strength of the current is 10A and the potential difference 12 volts. The 1% sodium chloride solution is subjected to successive treatments in the anode chamber 1 and in the cathode chamber 2 (FIGS. 6 and 7), or in reverse sequence (FIGS. 8 and 9). The valve 14 on the exit end of the cathodic outlet line 5 may be closed or open, thus allowing a part of the volume of slightly acidic or slightly alkaline solution obtained to be passed out through the discharge point of the line 5.

Taking into account that a volume of anodically or cathodically treated 1% sodium chloride solution is carried away from the apparatus for the purposes of obtaining the anodic and/or cathodic products of electrolysis, a varying specific quantity of electricity is used. This means that when the apparatus is working as shown in FIGS. 6 and 7 or FIGS. 8 and 9, it is possible to obtain, in the 1% sodium chloride solution, various quantitative ratios of mixed anodic and cathodic products of electrolysis, the composition of which depends on the pH of the solution of active chlorine obtained (the generally used term for the solution of alkaline metal chloride with compounds of active chlorine is "solution of active chlorine").

In the example examined with the help of the apparatus as shown in FIGS. 6 and 7, flows of slightly acidic, neutral or slightly alkaline solutions of active chlorine are obtained and carried away to the place of collection through the discharge points of the cathodic outlet line 5 and the additional exit line 11; but with the help of the apparatus as shown in FIGS. 8 and 9 a slightly alkaline solution of sodium hydroxide is also obtained (sodium chloride with sodium hydroxide) and carried away to the place of collection through the discharge point of the cathodic outlet line 5 with the valve 14 open. The composition, characteristics and sphere of application of these solutions are similar to those described in Example 1.

Checking the Efficiency of the Water Decontamination Process 1000 theoretically morbific microorganisms and viruses were introduced into 1 litre of water intended for drinking purposes (overall hardness 7 mg equ/l, chloride concentration 140–160 mg/l, permanganate oxidability index 7–10 mg $O_2$/l). This bacteriologically contaminated water was passed through the de-energised installation (experimental samples collected in accordance with FIGS. 3, 7 and 9) samples of water were taken from the exit line 10, and then taking into account the electrochemical water treatment cycles and regimes mentioned above, disinfection of the apparatus with subsequent operation in decontamination mode was carried out. An assessment of the efficiency of the disinfection of the water was made on the basis of the standardised acceptable bacteriological indices for drinking water as defined in GOST 2874-82; the overall quantity of bacteria in the Escherichia Coli group was not more than 3 to 1 litre. On the basis of the results of microbiological analyses it was established that 1 litre of contaminated water contained between 350 and 500 morbific microorganisms and viruses, but the samples of he decontaminated water satisfied the bacteriological requirements for drinking water.

The apparatus proposed, in its first and second embodiments, thus aims to achieve the following technical results:

the electrochemically treated liquid medium will be disinfected, or its bacterial contamination will be lowered together with a simultaneous lowering of the quantitative content of organic substances, iron and alkaline earth and heavy metals;

solutions with the anodic and/or cathodic products of electrolysis can be obtained and their quantitative ratios, pH and/or redox potential can be regulated; for example, a solution of active chlorine with a pH of between 4.5 and 7.5 used as a sterilising solution, disinfectant, decontaminant, bleaching agent, detergent or medicine with antibacterial and antiviral action may be obtained. The apparatus may achieve disinfection and purification of the surfaces of the outlet and exit pipes in semi-automatic mode, using a bactericidal solution obtained in the anode chamber with compounds of active chlorine and ozone.

What is claimed is:

1. An apparatus for the electrolytic treatment of a liquid medium, the apparatus comprising an electrolytic cell having an anode chamber containing an anode and a cathode chamber containing a cathode, the chambers being separated from each other by a permeable membrane, a feed line for supplying the liquid medium to the anode and the cathode chambers, a cathodic outlet line for carrying liquid medium away from the cathode chamber to a discharge point, the cathodic outlet line having a consumption regulator positioned thereon, a catalytic reactor, a first anodic outlet line for carrying liquid medium away from the anode chamber and to the catalytic reactor, an exit line connected to the catalytic reactor for carrying liquid medium to a collection point, a second anodic outlet line for carrying the liquid medium away from the anode chamber and to the collection point while bypassing the catalytic reactor, the second anodic outlet line containing a consumption limiter and/or a normally-closed regulator valve or consumption regulator, and a flow switching device to which is connected the first anodic outlet line, an entry line to the catalytic reactor and an exit line to a discharge point.

2. An apparatus as claimed in claim 1, wherein a midstream expansion tank is provided on the first anodic outlet line in front of the flow switching device.

3. An apparatus as claimed in claim 2, wherein at least one purification filter is provided on the first anodic outlet line or on the exit line and/or on a connecting line by means of which the first anodic outlet line is connected to the cathode outlet line.

4. An apparatus as claimed in claim 3, wherein there is provided a water-jet pump measuring device having at least one midstream ejector chamber positioned on the feed line and/or on a connecting branch leading away therefrom, by means of which the feed line is connected to the cathode chamber, the ejector chamber having at least one nozzle for inward suction to which an auxiliary line with a consumption regulator and/or filter is connected, the outflow point thereof being connected to the anodic or cathodic outlet line or positioned in a reagent solution tank, or communicating with the atmosphere.

5. An apparatus as claimed in claim 4, wherein there is provided a device for measuring and controlling the pH and/or redox potential of the flow of processed liquid medium, the electrodes of this device being positioned at an end of the first anodic outlet line in front of the flow switching device.

6. An apparatus as claimed in claim 1, wherein the anode chamber of the electrolytic cell has an inlet for the feed line, an outlet to the first anodic outlet line, and an outlet to the second outlet line.

7. An apparatus as claimed in claim 1, wherein the electrolytic cell, which is either flat or cylindrical in form, has a vertical, horizontal or sloping working position.

8. An apparatus for the electrolytic treatment of a liquid medium, the apparatus comprising an electrolytic cell having an anode chamber containing an anode and a cathode chamber containing a cathode, the chambers being separated from each other by a permeable membrane, a feed line for supplying the liquid medium to the anode chamber or the cathode chamber, a flow switching line for carrying liquid medium from the anode chamber or an outlet line thereof to the cathode chamber or vice versa, a cathodic outlet line for carrying liquid medium away from the cathode chamber to a discharge point, the cathodic outlet line having a consumption regulator positioned thereon, a catalytic reactor, a first anodic outlet line for carrying liquid medium away from the anode chamber and to the catalytic reactor, an exit line connected to the catalytic reactor for carrying liquid medium to a collection point, a second anodic outlet line for carrying the liquid medium away from the anode chamber and to the collection point while bypassing the catalytic reactor, the second anodic outlet line containing a consumption limiter and/or a normally-closed regulator valve or consumption regulator, and a flow switching device to which is connected the first anodic outlet line, an entry line to the catalytic reactor and an exit line to a discharge point.

9. An apparatus as claimed in claim 8, wherein a midstream expansion tank is provided on the first anodic outlet line in front of the flow switching device and/or on the flow switching line.

10. An apparatus as claimed in claim 9, wherein at least one purification filter is provided on the first anodic outlet line or on the exit line and/or on the flow switching line and/or on a connecting line by means of which the first anodic outlet line is connected to the cathode outlet line.

11. An apparatus as claimed in claim 10, wherein there is provided a water-jet pump measuring device having at least one midstream ejector chamber positioned on the feed line and/or on a connecting branch leading away therefrom and/or on the flow switching line, by means of which the feed line is connected to the cathode chamber, the ejector chamber having at least one nozzle for inward suction to which an auxiliary line with a consumption regulator and/or filter is connected, the outflow point thereof being connected to the anodic or cathodic outlet line or positioned in a reagent solution tank, or communicating with the atmosphere.

12. An apparatus as claimed in claim 11, wherein there is provided a device for measuring and controlling the pH and/or redox potential of the flow of processed liquid medium, the electrodes of this device being positioned at an end of the first anodic outlet line in front of the flow switching device.

13. An apparatus as claimed in claim 9, wherein there is provided a water-jet pump measuring device having at least one midstream ejector chamber positioned on the feed line and/or on a connecting branch leading away therefrom and/or on the flow switching line, by means of which the feed line is connected to the cathode chamber, the ejector chamber having at least one nozzle for inward suction to which an auxiliary line with a consumption regulator and/or filter is connected, the outflow point thereof being connected to the anodic or cathodic outlet line or positioned in a reagent solution tank, or communicating with the atmosphere.

14. An apparatus as claimed in claim 8, wherein the anode chamber of the electrolytic cell has an inlet for the feed line, an outlet to the first anodic outlet line, and an outlet to the second outlet line.

15. An apparatus as claimed in claim 8, wherein the electrolytic cell, which is either flat or cylindrical in form, has a vertical, horizontal or sloping working position.

* * * * *